United States Patent [19]
Moore

[11] 3,728,704
[45] Apr. 17, 1973

[54] AUTOMATIC TRANSMISSION FLUID LEVEL INDICATOR

[76] Inventor: Thomas Moore, 3440 Kenyon Avenue, Baltimore, Md. 21213

[22] Filed: Apr. 19, 1971

[21] Appl. No.: 134,981

[52] U.S. Cl. ............................340/244 A, 200/84 R
[51] Int. Cl. ..............................................G08b 23/00
[58] Field of Search .....................340/244 A, 244 R

[56] References Cited

UNITED STATES PATENTS

| | | | |
|---|---|---|---|
| 1,244,962 | 10/1917 | Derby | 340/244 A |
| 2,804,517 | 8/1957 | Ferry | 340/244 A |
| 2,915,605 | 12/1959 | Freidell | 340/244 A |
| 3,098,914 | 7/1963 | Giannino | 340/244 R |
| 3,633,193 | 1/1972 | Milo | 340/244 A |

Primary Examiner—Thomas B. Habecker
Attorney—Mason, Mason & Albright

[57] ABSTRACT

An automatic transmission fluid level indicator having a removable rod with an area of reduced diameter at and extending below the desired fluid level, a float including a conductive ring surrounding the reduced area, a circuit received in the rod connects a battery with a lamp or other indicator through the conductive ring upon sufficient descent of the float to indicate a significant decline in the fluid level. The float with the conductive ring is urged downwardly by a compression spring which, however, is insufficient in force to overcome the buoyance effect of the fluid upon the float, but when the rod is drawn out of the fluid, the circuit is automatically closed. A plug on top of the shaft provides for removal of the rod from the circuit. The amount of extension of the rod into the automatic transmission casing is adjustable whereby the amount of fluid loss to energize the indicator is also adjustable.

9 Claims, 2 Drawing Figures

PATENTED APR 17 1973  3,728,704

INVENTOR
THOMAS MOORE
BY
Mason, Mason & Albright
ATTORNEYS

AUTOMATIC TRANSMISSION FLUID LEVEL INDICATOR

BACKGROUND OF THE INVENTION

A substantial source of difficulty with automatic transmissions as are used in automobiles stems from leakage of the automatic transmission fluid. Unfortunately, the level of the automatic transmission fluid is generally not checked with the same frequency as the oil level in internal combustion engines because it is usually in a less accessible place and, more importantly, because the motor must be running when the test is conducted. A need exists, and has existed for some time, for a reliable fluid level indicator for automatic transmissions.

SUMMARY OF THE INVENTION

The invention relates to a fluid level indicator for automatic transmissions and, more particularly, to such an indicator which can be utilized to replace the dip stick presently utilized as an indicator in existing conventional automatic transmissions.

It has occurred to the inventor, that the tube presently utilized to receive the dip stick in automatic transmissions of the type found in most automobiles today, can also be employed for an automatic liquid level indicator which will signal the driver of the vehicle in the event that the automatic transmission fluid is dangerously low or has declined an amount which the operator of the vehicle desires to be aware of. The liquid level indicator in accordance with my invention has the advantage that it can also be utilized in the same manner as the conventional dip stick to indicate directly the level of the automatic transmission fluid and at the same time provide a test for the indicia means when the invention is so used. Further, the structure of the device is such that it may be adjusted so that it is energized upon selected different reductions in the level of the transmission fluid.

A fluid level indicator in accordance with my invention is relatively easy and inexpensive to manufacture, can be adapted to many types of automatic transmissions, is easily installed on existing automobiles, and is reliable in operation.

Other objects, adaptabilities and capabilities will be appreciated by those skilled in the art as the description progresses, reference being had to the accompanying drawings, in which:

DESCRIPTION OF THE PREFERRED EMBODIMENT

Figures 1, 2:
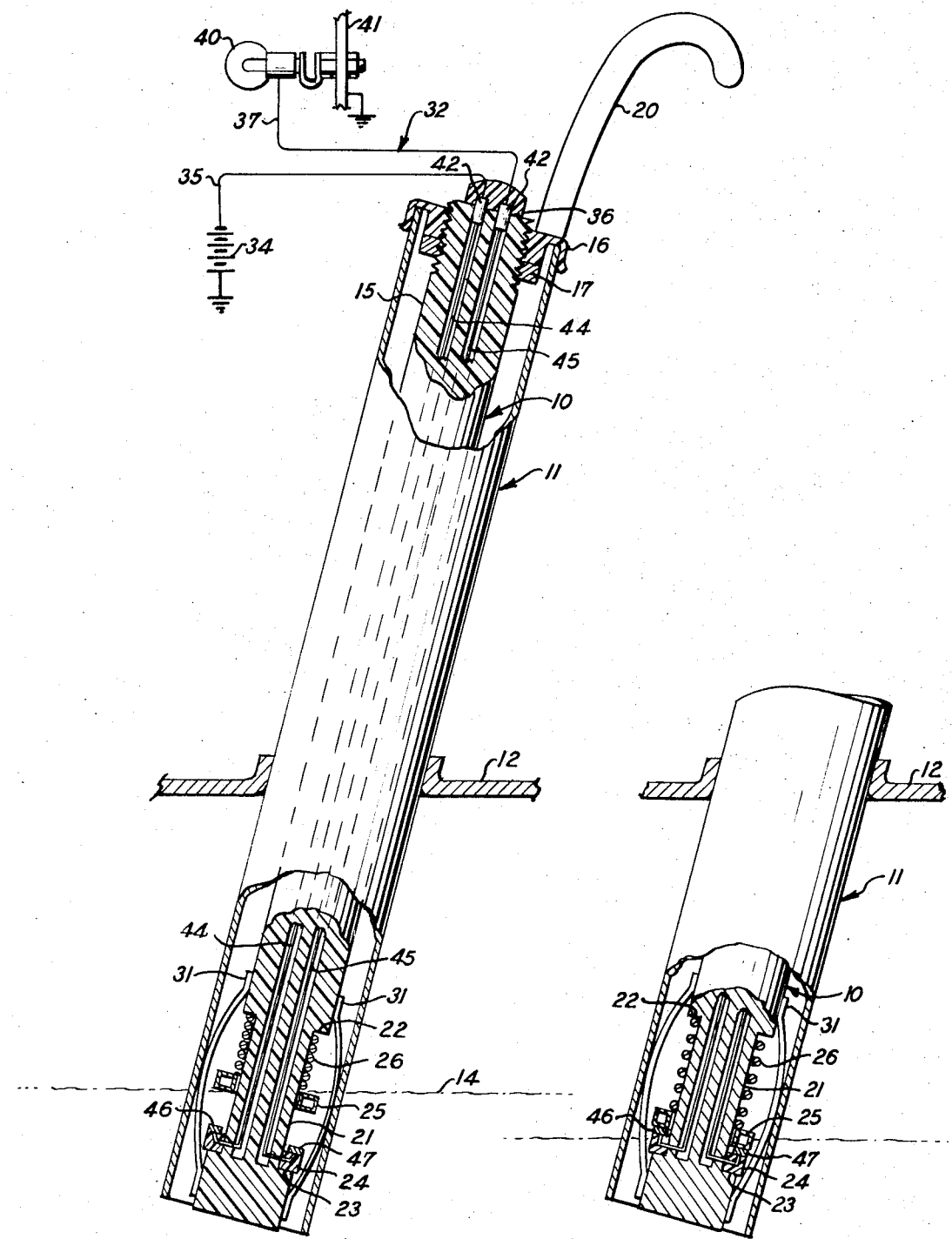
FIG. 1 shows the invention in partial cross section with the electrical circuit being shown, in part, schematically.
FIG. 2 illustrates the closing of the indicator circuit when the amount of fluid in the automatic transmission is reduced by a predetermined amount.

Referring to the Figures, the level indicator is designated generally by reference numeral 10. It is received in a tube 11 which extends generally upwardly from the casing 12 which contains the automatic transmission and automatic transmission fluid 14. It will be appreciated that the automatic transmission of almost all automobiles conventionally includes a tube 11, casing 12 as well as, of course, fluid 14. However, in place of the dip stick which is generally received within tube 11, level indicator 10 is provided which comprises a shaft 15 which is threadably connected in its upper aspect to a tube cover 16 and is secured in a desired position relative to tube cover 16 by a lock nut 17. A handle 20 is connected to and extends upwardly from the tube cover 16. In its lower aspect, the shaft 15 contains a narrowed portion 21 under shoulder 22 and extending above a contact part 24 which is secured to portion 21 abutting shoulder 23 of shaft 15. A ring float 25 which can be cork or any appropriate buoyant material, but is preferably a hollow copper washer, surrounds portion 21 so as to be movable therealong. Between shoulder 22 and ring float 25, a compression spring 26 is provided which urges ring float 25 downwardly towards contact part 24, as shown in FIG. 1, but is insufficient in strength to overcome the buoyancy of ring float 25 in fluid 14. However, when fluid 14 is sufficiently low in casing 12 as shown in FIG. 2, compression spring 26 urges ring float 25 against part 24. In its lowest aspect, portion 30 of shaft 15, a pair of spring protectors 31 are connected thereto which serve to center shaft 15 within tube 11 and and prevent ring float 25 from touching the sides of tube 11. Shaft 15 is preferably composed of a non-conductive plastic, such as the plastic material known as Bakelite.

The electrical circuit for level indicator 10 is designated generally 32 and comprises as a source of electrical energy, a battery 34 which connects through conductive line 35 into a socket of receptacle 36. A further conductive line 37 also connects another socket of receptacle 36 with an electric light bulb 40 which has a bayonet-type base and is normally mounted on a grounded dashboard 41 or other grounded portions of an automobile in such a way that if electrical energy is provided via line 37, light bulb 40 is energized. There are many arrangements whereby the bulb 40 can be attached to an automobile dashboard or otherwise so as to be visible to the operator of the automobiles which are conventional and generally widely known in the field to which the invention pertains. Accordingly, this is not described in detail inasmuch as it is not necessary for an understanding and use of the invention by a person skilled in the art. Also, it will be understood that a buzzer or bell can be used instead of, or in conjunction with bulb 40.

Receptacle 36 has two sockets which are adapted to receive prongs from a plug 42 which is secured on the upper aspect of shaft 15. Preferably, plug 42 comprises simply two prongs extending from shaft 15 which are adapted to be received by receptacle 36 so that each prong is electrically connected either to line 35 or line 37. Shaft 15 has a pair of wires 44 and 45 extending through channels through its center to part 24. In part 24, wire 44 electrically connects to a contact member 46 and wire 45 electrically connects to a further contact member 47, which are included in part 24.

In operation, with the fluid 14 at the level shown in FIG. 1, it is to be understood that circuit 32 is opened between contact members 46 and 47. However, if fluid 14 is lowered to the position shown in FIG. 2 wherein there is, say, a 1 quart reduction in the volume of fluid, float ring 25 provides a conductive bridge between the members 46 and 47, thus closing the circuit and causing bulb 40 to be energized. In this connection, it will be appreciated that if ring float 25 is composed of a conductive material, the float itself provides the conductive bridge. However, if this is not the case, then a conductive bridge must be provided on the float which can be, if the float should happen to be cork, a thin gauge washer of copper or aluminum or the like, connected to the lower surface of ring float 25.

If desired, the level indicator 10 can be withdrawn by means of handle 20. When this occurs, the ring float 25, upon being drawn away from fluid 14, is urged by compression spring 26 against the contact part 24 thus closing circuit 32 and this provides a test bulb 40 to show whether it is operable. Without such means for periodic testing, the indicator might provide false information for an extended period of time. In the event that it is desired to remove indicator 10 some distance from the tube 11, receptacle 36 may be easily detached from plug 42 and the circuit is such that the system is operable irrespective of whether plug 42 and receptacle 36 are again joined as before or with the prongs of plug 42 being received in opposite sockets of receptacle 36.

Although I have described the preferred embodiment of my invention, it is to be understood that it is capable of other adaptations and modifications. For example, the same basic arrangement may be utilized as a lubricating oil indicator.

Having thus described my invention, what I claim as new and desire to secure by Letters Patent of the United States is:

1. In combination with a casing which contains a non-conductive fluid, a fluid level indicator which comprises a shaft removably extending from outside of the casing into said fluid, a tube extending upwardly from said casing receiving said shaft, a tube cover connected to said shaft cooperating with the top of said tube to retain said shaft in a predetermined position relative to said casing, float means carried by said shaft, said float means including conductive bridge means, said float means being buoyant relative to said fluid and movable within limits relative to said shaft, electrically operated indicia means, resilient means mounted on said shaft relative to said float means, electrical energy producing means, and a circuit for connecting said indicia means to said energy producing means, said circuit means being received in said shaft and including a pair of contacts, said resilient means resiliently urging said float means toward said contacts with a downwardly directed force which is insufficient to overcome the buoyancy of said float means in said fluid, said circuit means being in an opened condition across said contacts, said contacts being affixed to said shaft relative to said float means whereby when said float means lowers a predetermined amount relative to said shaft due to a lowering of said fluid in said casing or withdrawal of said shaft above said fluid, said conductive bridge means conductively connects said contacts to close said circuit to energize said indicia means.

2. The apparatus of claim 1 wherein said float means comprises a ring which surrounds said shaft.

3. The apparatus of claim 2 wherein said ring is hollow and is composed of a conductive material.

4. The apparatus of claim 3 wherein said shaft includes a narrowed portion which receives said ring.

5. The apparatus of claim 4 wherein said resilient means is mounted relative to said narrow portion and said ring which urges said ring.

6. The apparatus of claim 5 wherein said resilient means comprises a compression spring which surrounds said narrowed portion.

7. The apparatus of claim 1 wherein adjustment means is included in the connection of said shaft to said tube cover whereby the amount of extension of said shaft into said casing is adjustable.

8. The apparatus of claim 1 wherein said casing contains an automatic transmission for a prime mover and said fluid is automatic transmission fluid.

9. The apparatus of claim 1 wherein said circuit includes plug means and receptacle in the upper aspect of said shaft.

* * * * *